United States Patent [19]

Rudi

[11] Patent Number: 4,489,355
[45] Date of Patent: Dec. 18, 1984

[54] LOCKING DEVICE FOR A MAGNETIC TAPE CASSETTE IN A MAGNETIC TAPE DEVICE

[75] Inventor: Guttorm Rudi, Fjellhamar, Norway

[73] Assignee: Tandberg Data A/S, Oslo, Norway

[21] Appl. No.: 363,443

[22] Filed: Mar. 30, 1982

[30] Foreign Application Priority Data

Mar. 31, 1981 [DE] Fed. Rep. of Germany ....... 3112845

[51] Int. Cl.³ .............................................. G11B 15/24
[52] U.S. Cl. ..................................... 360/96.5; 242/198
[58] Field of Search ....................... 360/93, 96.5, 96.1; 242/198, 199

[56] References Cited

U.S. PATENT DOCUMENTS

| | | | |
|---|---|---|---|
| 3,964,098 | 6/1976 | Kramer et al. | 360/93 |
| 4,014,042 | 3/1977 | Schoettle et al. | 360/132 |
| 4,071,859 | 1/1978 | Sami | 360/96.5 |
| 4,156,260 | 5/1979 | Joshi | 360/96.1 |

FOREIGN PATENT DOCUMENTS 1216936  5/1966  Fed. Rep. of Germany .
2429154  1/1976  Fed. Rep. of Germany .

Primary Examiner—Bernard Konick
Assistant Examiner—Paul Stefanski
Attorney, Agent, or Firm—Hill, Van Santen, Steadman & Simpson

[57] ABSTRACT

A locking device for a magnetic tape cassette in a magnetic tape device has a lever disposed below the insertion slot; a blocking arm projecting out of the housing; a thrust arm; and an ejector arm. When a magnetic tape cassette is locked in with the locking arm, the thrust arm engages via a wedge with a cartridge-like carrier provided with three rotary bodies and by upward movement of the carrier towards the insertion slot presses the rotary bodies into the insertion slot from below and against the magnetic tape cassette. The magnetic tape cassette is thereby securely held at the reference points. When releasing the locking arm, the magnetic tape cassette is ejected by the pre-stressed ejector arm.

12 Claims, 5 Drawing Figures

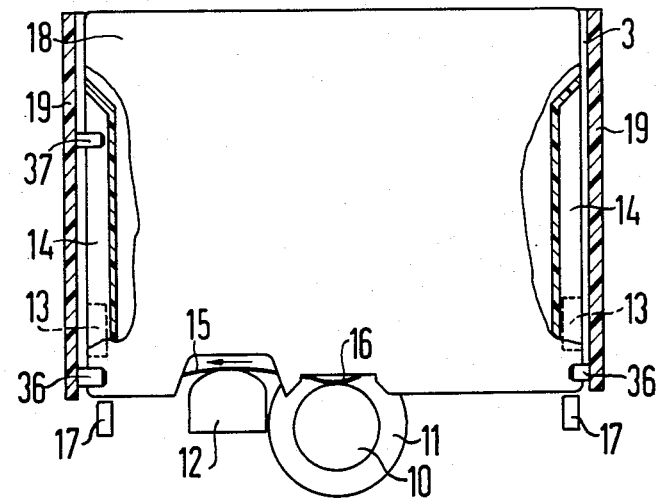
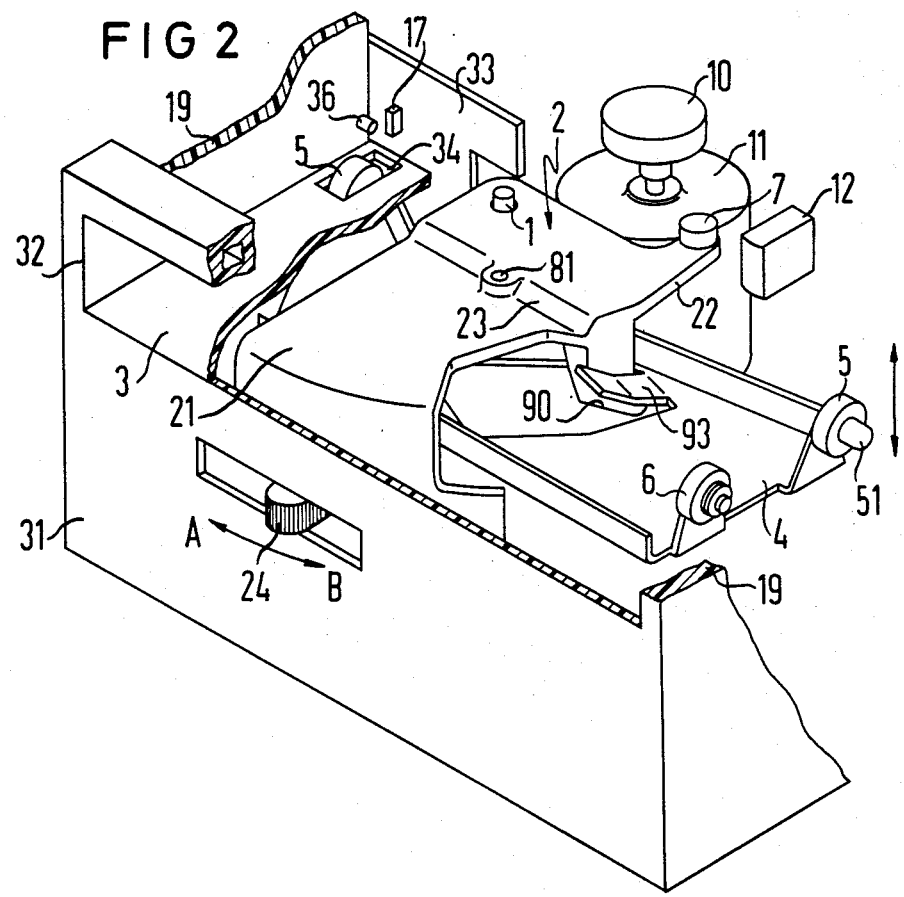

LOCKING DEVICE FOR A MAGNETIC TAPE CASSETTE IN A MAGNETIC TAPE DEVICE

BACKGROUND OF THE INVENTION

The invention relates to a locking device for a magnetic tape cassette having engagements in its underside. The cassette is received in an insertion slot of a magnetic tape device. A lock-in device holds the magnetic tape cassette in a reference position and an ejection means is also provided.

When sensing a magnetic tape with a magnetic head in a magnetic tape device, it is necessary for disruption-free operation that the magnetic tape and the sensing head be disposed in a defined position relative to one another. For that purpose, a plurality of reference stops are provided. The number and position is specified, for example, in the ECMA Standard No. 46. However, there is the danger that the magnetic tape cassette will change its position relative to the reference stops, or relative to the sensing head during sensing if it is not sufficiently secured.

For that purpose a lock-in device is known which exhibits two spring-tensioned rollers which constantly extend from below into the insertion slot. When a magnetic tape cassette is inserted, these rollers engage with the engagements and thus hold the cassette fast. It is a disadvantage, however, that a relatively great force is required in order to introduce or, respectively, withdraw the magnetic tape cassette into or, respectively, from the insertion slot, since the spring power of the rollers must be overcome. Also, the magnetic tape cassette is only pressed against two of the reference stops, so that only a limited lock-in is achieved. Since, moreover, it is already pressed against the two reference stops during introduction or, respectively, withdrawal, it is subject to high wear at the points of contact.

These disadvantages are avoided by a further, known lock-in device which exhibits three spring-tension arms provided with rollers and a motor. The motor drives two cam plates which hold two of the arms outside of the insertion slot until a cassette has been inserted and a position sensor has emitted a control signal for lock-in or, respectively, when an operator has given a control signal for unlocking. During that time, the third arm is held outside of the insertion slot by means of a spring connected to the two first arms. The lock-in ensues such that, by means of turning the cam plates, the blockage of the two first arms is released so that they are pressed into the insertion slot and against the underside of the magnetic tape cassette by their spring tension. At the same time, the cam plate likewise presses the third arm into the insertion slot and against the magnetic tape cassette. What is disadvantageous is the large space requirement arising due to the employment of the motor. Moreover, the assembly of the large number of individual parts requires considerable time. The danger is present in both lock-in devices that the magnetic tape cassette will release from the reference position when it is influenced by an external force which neutralizes the spring forces.

SUMMARY OF THE INVENTION

It is therefore an object of the invention to specify a locking device of the aforementioned type which requires a small number of individual parts and which makes a motor as well as a position sensor together with the corresponding control means superfluous. This object is achieved in that a lock-in device is provided having a lever seated in an axis of revolution disposed in perpendicular fashion relative to the base area, and further exhibiting a locking arm and a thrust arm. A carrier movably disposed at an angle relative to the base surface, is connected to the thrust arm via a wedge gearing, and exhibits at least three rotary bodies. The ejection means consists of an ejector arm connected to the lever and a dog attached thereto. The lever is connected to a spring element which assumes two stable conditions.

The locking device has the advantage that hardly any exertion of force is necessary in order to introduce or, respectively, withdraw the magnetic tape cassette into or, respectively, from the insertion slot. Further, no wear of the magnetic tape cassette arises due to friction against the reference stops. The cassette can be completely introduced into the insertion slot so that it aligns with a front plate of the magnetic tape device. In the lock-in, it is pressed against at least three reference stops, so that it is securely held in the reference position. The lock-in of the magnetic tape cassette ensues automatically. A motor can be eliminated. A secure lock-in is achieved which prevents the magnetic tape cassette from releasing by itself, or due to the influence of external forces, unless the ejector arm is intentionally actuated. The ejector device can only become effective when the lock-in device is released.

BRIEF DESCRIPTION OF THE DRAWINGS

FIG. 1 shows an arrangement of a magnetic tape cassette in an insertion slot;

FIG. 2 shows a schematic view of a lock-in device and its disposition in a magnetic tape device;

DESCRIPTION OF THE PREFERRED EMBODIMENTS

Figure 3:
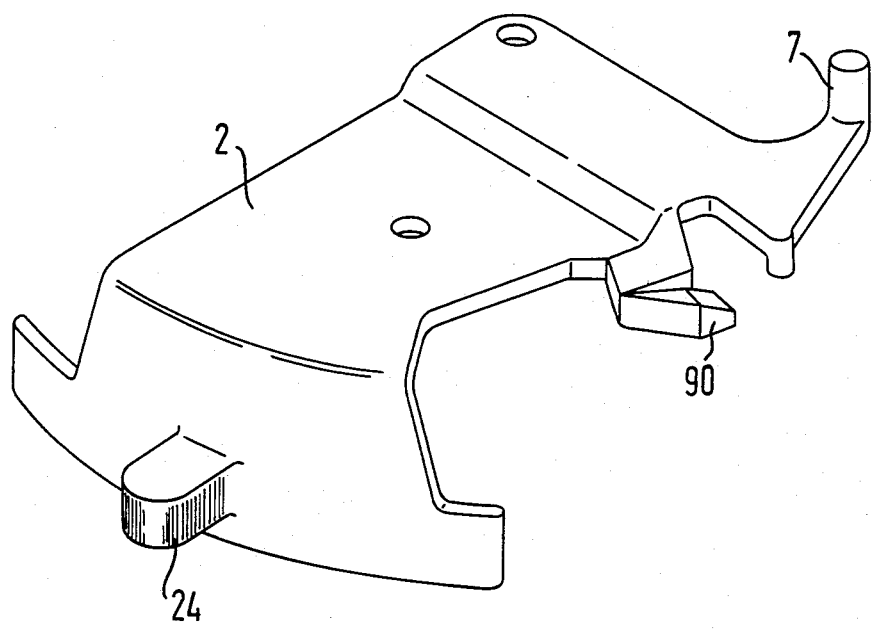
FIG. 3 shows a sample embodiment of a lever.

Illustrated in FIG. 1 is a magnetic tape cassette 18 which is introduced into an insertion slot of a magnetic tape device. The insertion slot is limited by a base area 3 and two lateral walls 19. Disposed at the end face 20 of the magnetic tape cassette 18 are a magnetic tape transport motor 11 with a capstan 10, a magnetic head 12, and two stops 17. A magnetic tape 15 is guided between the capstan 10 and a pressure roller 16, and proceeds past the magnetic head 12 in the arrow direction. At its lower side, the magnetic tape cassette 18 exhibits two engagements 13. Moreover, guidance grooves 14 are provided along the lateral walls 19 in the magnetic tape cassette 18. Upon insertion of the magnetic tape cassette 18 into the insertion slot, these accept the reference stops 36, 37 attached to the lateral walls 19. This disposition of the magnetic tape cassette 18 in the insertion slot is designated the reference position. The two reference stops 36 disposed close to the stops 17 are referred to as the front reference stops 36. A third is referred to as the back reference stop 37.

The housing 31 of the magnetic tape device is partially cut in FIG. 2 so that the locking device is clearly shown. The insertion slot with the base area 3 and the lateral walls 19 is provided at the front face of the housing 31 with an insertion aperture 32 for the introduction of the magnetic tape cassette 18. A lever 2 is disposed beneath the base area 3. It is seated in an axis of revolution 1 which is perpendicular to the base area 3. The lever 2 exhibits a locking arm 21, an ejector arm 22, and a thrust arm 23. A wedge 90 is disposed thereon. The end of the locking arm 21 forms a push grip or knob which extends out of the housing 31.

A spring element which may assume two stable conditions is disposed between the lever 2 and the housing 31. It holds the lever 2 or, respectively, the locking arm 21 in one of two stable positions. The position A corresponds to the condition "not locked", and position B corresponds to the condition "locked-in". In order to move the spring element from one stable condition into the other, a spring force must be overcome until a dead center has been reached.

A carriage-like carrier 4 is disposed below the lever 2. It exhibits three rotary bodies 5, 6 and a tab 93 for the engagement of the wedge 90. The magnetic tape transport motor 11, capstan 10, magnetic head 12, and stop 17 are disposed on the housing 31 in a known manner. This structure is therefore not illustrated in detail. The stops 17 are attached to a back side 33 of the insertion slot.

Together, the wedge 90 and the tab 93 form a wedge gearing 90, 93. Together with the lever 2 exhibiting the locking arm 21 and the thrust arm 23, as well as together with the carrier 4 exhibiting the rotary bodies 5, 6, a lock-in device is formed for holding the magnetic tape cassette 18 in the reference position. The ejector arm 22 and a dog or abutment piece 7 attached thereto form an ejector means with which a magnetic tape cassette 18 introduced into the insertion slot is at least partially ejected from the insertion slot when the push grip 24 is moved by the spring element 8 from position B into position A.

The base area 3 exhibits three passages 34. Two of them are disposed in such manner that, given a magnetic tape cassette 18 introduced in the machine, they lie below the engagements 13. They are designed longer toward the front and back in the insertion direction than the engagements 13. As evident from FIG. 1, they lie in the proximity of the front reference stops 36. They are referred to as front passages. A further passage 34 is disposed in the proximity of the back reference stop 37. It is referred to as a back passage. Its size depends on the size of the engagements 13. Two of the rotary bodies 5, 6 lie directly below the front passages (front rotary bodies 5). A back rotary body 6 lies under the back passage. The axes of the front rotary bodies 5 lie on an imaginary line and respectively exhibit an axle extension 51 projecting beyond the carrier 4. The back rotary body 6 is disposed laterally offset relative to one of the front rotary bodies 5. The direction of rotation of all rotary bodies 5, 6 is, of course, the same as the insertion direction. They rest against a housing part which is not illustrated. The axial extensions 51 are respectively guided in a groove (not illustrated) positioned perpendicular relative to the base area 3, so that the carrier 4 can only be moved in this direction.

FIG. 3 shows an advantageous design of the wedge 90. It is formed of a synthetic material with good gliding properties.

Figure 4:
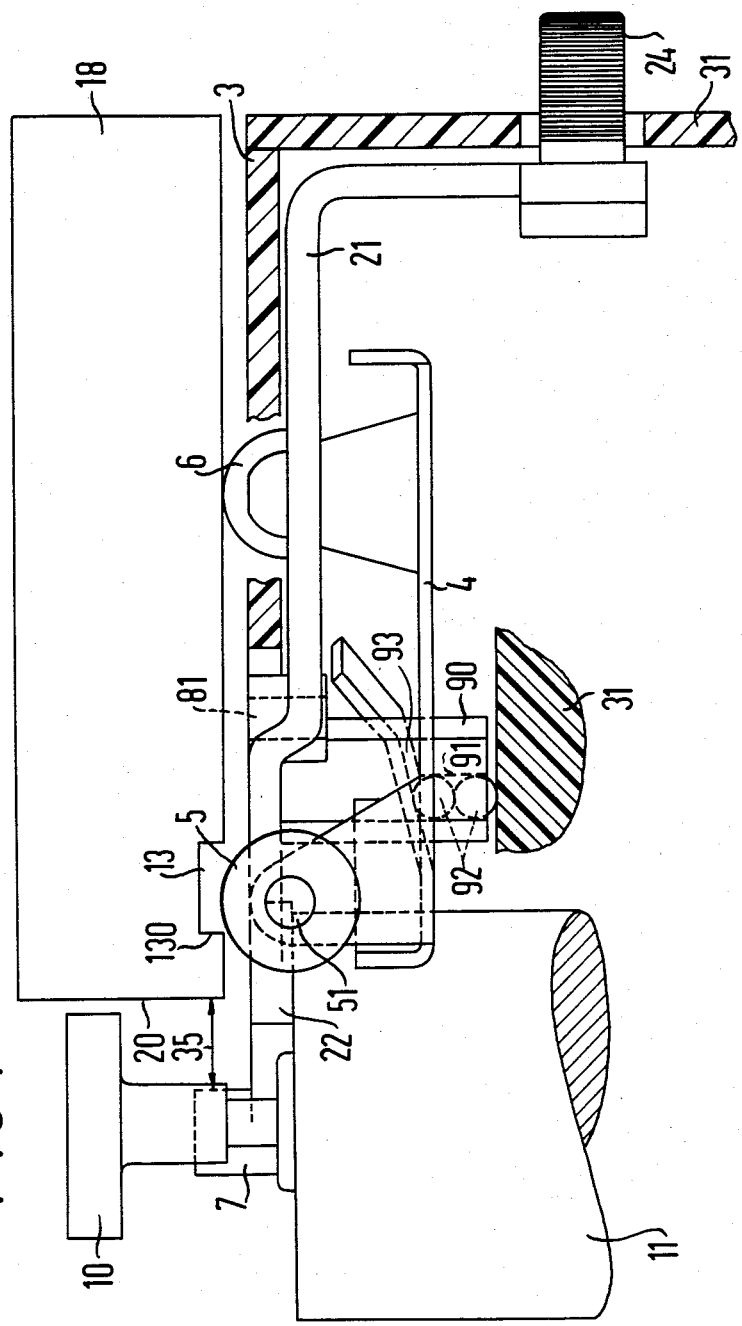
FIG. 4 shows a side view of the lock-in device.

A further design of the wedge gearing 90, 93 is illustrated in FIG. 4. The wedge 90 exhibits a ball bearing with a bearing housing 91 and two balls 92. The bearing housing 91 is designed as a vertically proceeding, cylindrical hollow space. The balls 92 are disposed therein lying above one another, whereby a ball section of each ball 92 projects out of the hollow space. The lower ball serves as a running surface for a part of the housing 31. The upper ball serves as a running surface for the tab 93.

Figure 5:
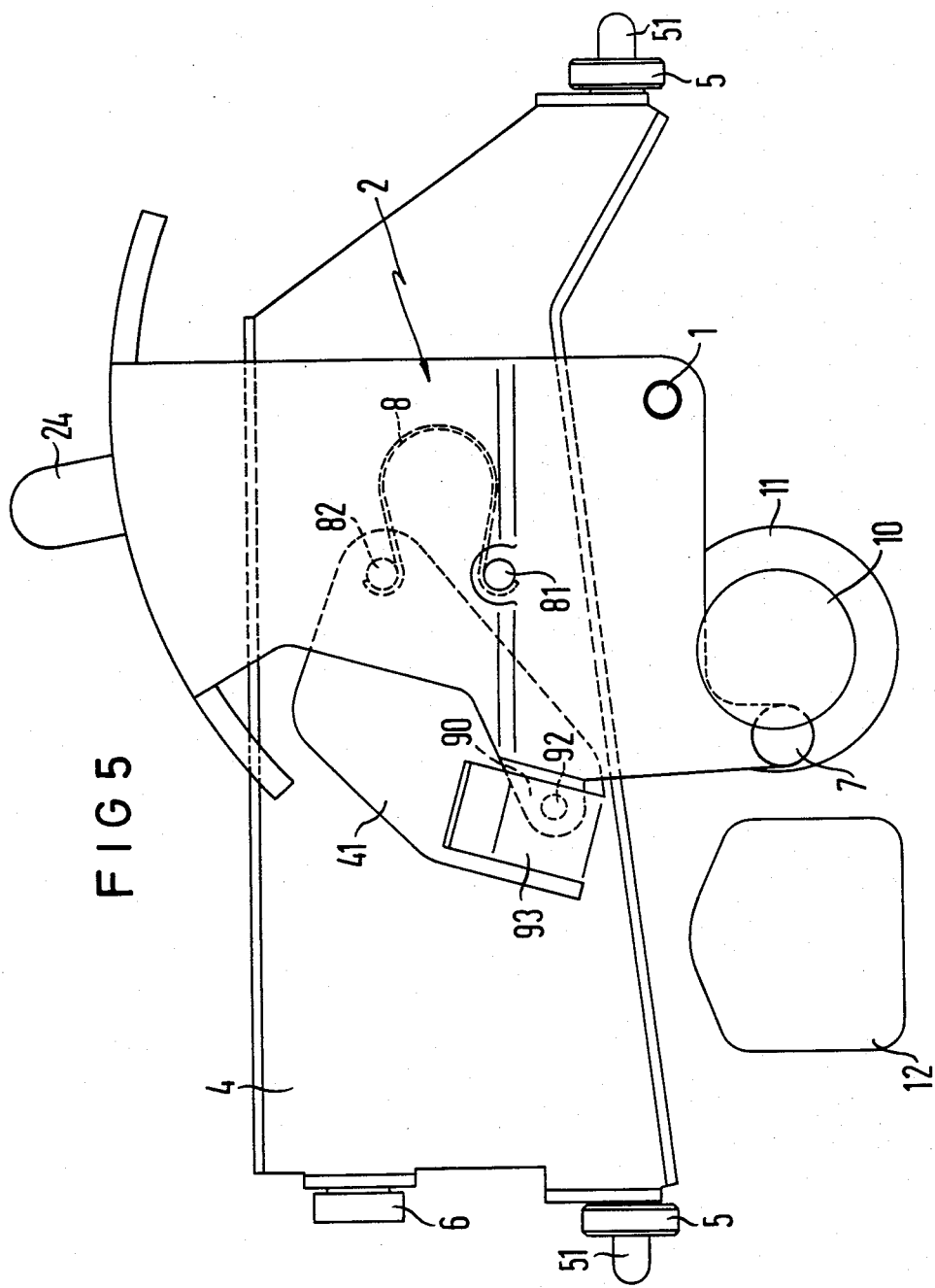
FIG. 5 shows a plan view of the lock-in device.

FIG. 5 essentially shows a plan view of the lever 2 and the carrier 4. Their geometrical dimensions derive from their disposition in the magnetic tape device. However, they are not decisive in the functioning of the system. A first pin 81 is conducted out of the underside of the lever 2. It serves for fastening the spring element 8 designed as a catch spring. It is held at its other end at a second pin 82 which is secured to the housing 31. The carrier 4 exhibits an opening 41 in order to create space for the wedge 30 and its movements. The dog or abutment 7 is disposed between the magnetic head 12 and the capstan 10.

In the following, the function of the locking device is described on the basis of the Figures. In position A of the push grip 24, the magnetic tape cassette 18 is completely introduced into the insertion slot through the insertion aperture 32. In this position, the dog 7 is situated in the insertion slot. The end face 20 of the magnetic tape cassette 18 pushes it out of the insertion slot toward the back. Accordingly, the spring element 8 is tensioned via the lever 2 until it overcomes dead center. Spring force is then released and the spring element 2 assumes its second stable condition. Therefore it automatically moves lever 2 or, respectively, the push grip 24 from position A into position B. Since, moreover, the thrust arm 23 is thereby simultaneously moved, the wedge 90 is automatically shoved under the tab 93. The position of the dog 7 in the stable condition which corresponds to the position B of the push grip 24 is characterized by a distance from the end face 20 of the magnetic tape cassette 18. This distance is referred to as the buffer path or gap 35.

The horizontal displacement of the wedge 90 is transformed into a vertical displacement of the carrier 4. Since the front rotary bodies 5 are disposed below the engagements 13 and their front edge 130, they come into contact with the front edge 130 given the vertical movement and, by so doing, exert a force against the magnetic tape cassette 18. The force has a horizontal and a vertical component, i.e. the magnetic tape cassette 18 is simultaneously pushed deeper into the insertion slot and toward the top until it rests firmly against the two front reference stops 36 and the stops 17. At the same time, the back rotary body 6 exerts a vertical force against the bottom of the magnetic tape cassette 18 and thus presses it against the back reference stop 37. The forces of the front rotary bodies 5 against the magnetic tape cassette 18 are of equal size and greater than the force of the back rotary body 6.

The magnetic tape cassette is securely fixed and in the defined reference position. By means of a positive lock, the wedge 90 prevents a vertical movement of the carrier 4. Thus, without removal of the wedge 90, the magnetic tape cassette 18 cannot be moved out of the reference position. Only a vertical force component can be transmitted to the wedge. In the embodiment illustrated in FIG. 4, this force is deflected via the balls 92 onto the housing 31. The wedge 90 is held in its position by the spring element 8.

In order to eject the magnetic tape cassette 18 out of the insertion slot, the push grip 24 is moved from position B toward position A. By so doing, the wedge 90 is disengaged from the tab 93. By so doing, the carrier 4 moves down and releases the connection of the rotary bodies 5, 6 with the magnetic tape cassette 18. Subsequently, the ejector means is actuated, as is described in the following paragraph.

The dog 7 is of such a length that it extends over the lower edge of the magnetic tape cassette 18. The buffer path 35 is dimensioned in such manner that, upon displacement of the lever 2 from position B into position A, the dog 7 does not come into contact with the end face 20 until the wedge 90 has disengaged from the tab 93. It is only then that it exerts a force on the magnetic tape cassette 18 which is directed to the insertion opening 32, shoving the magnetic tape cassette out of the insertion slot by a specific length. It can then be entirely removed from the insertion slot pratically without exerting any force, since the force required for the ejection is released by releasing the tension of the spring element 8.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A locking device for a magnetic tape cassette which has two engagements at its underside and which is receivable in a stationary insertion slot of a magnetic tape device, the insertion slot having a rectangular base area, comprising:
   lock-in means for holding the magnetic tape cassette in a reference position;
   an ejector means for ejecting the tape cassette;
   the lock-in means comprising a horizontally movable lever seated in an axis of revolution disposed perpendicularly relative to the base area, the lever having a locking arm and a thrust arm, a carrier, guide means for permitting the carrier to move toward and away from the base area in substantially perpendicular fashion when actuated by the thrust arm via a wedge means which pushes by wedging action the carrier along the guide means, and the carrier having a plurality of engagement bodies engageable with the cassette in the stationary insertion slot;
   the ejector means comprising an ejector arm connected to the lever and an abutment connected thereto; and
   the lever being horizontally movable between lock and unlocked positions such that when moving towards the lock position the engagement bodies engage with the engagements of the cassette and when moving toward the unlock position the ejector arm and abutment are dimensioned such that the abutment pushes the cassette partially out of the insertion slot.

2. A locking device according to claim 1 wherein a gap is provided between the abutment and an end face of the magnetic tape cassette when the cassette is loaded and locked in position.

3. A locking device according to claim 1 wherein the wedge means comprises a tab disposed on the carrier and forming an oblique planar cam surface, and of a wedge connected to the thrust arm, said wedge acting on the cam surface to push the carrier along said guide means in said substantially perpendicular direction.

4. A locking device according to claim 3 wherein the wedge is comprised a synthetic material with good gliding properties.

5. A locking device according to claim 1 wherein the wedge means comprises a ball bearing with a bearing housing and at least one ball which engages with a tab on the carrier so as to push said carrier by wedging action along said guide means in said substantially perpendicular direction.

6. A locking device according to claim 1 wherein the engagement bodies comprise three rotary bodies comprising two front rotary bodies and a back rotary body, and wherein two front passages in the base area are disposed above the front rotary bodies and a back passage is disposed above the back rotary body.

7. A locking device according to claim 6 wherein the front rotary bodies respectively exhibit an axial extension extending beyond the carrier, and a housing of the magnetic tape device has two vertically proceeding grooves for acceptance of a respective axial extension.

8. A locking device according to claim 6 wherein the front rotary bodies and the front passages are disposed in such manner that a respective front rotary body and a front passage lie below one of the engagements of the magnetic tape cassette completely introduced into the insertion slot.

9. A locking device according to claim 8 wherein the front passages are extended at least beyond a front edge of the respective engagement.

10. A locking device according to claim 6 wherein the back rotary body and the back passage are disposed in a proximity of a back reference stop engageable with a portion of the cassette.

11. A locking device for a magnetic tape cassette which has at least one engagement aperture therein and which is receivable in a stationary insertion slot having a base area of a magnetic tape device, comprising: lock-in means for holding the magnetic tape cassette in a reference position; an ejector means for ejecting the tape; the lock-in means comprising a horizontally rotatable lever operable about an axis of revolution disposed perpendicularly relative to the base area of the insertion slot, and having a wedge arm extending therefrom; a vertically movable carrier adjacent the base area of the insertion slot; guide means for the carrier; projection means on the carrier acted on through wedging action by the wedge arm to move the carrier vertically along the guide means towards the base area of the insertion slot, the carrier having an engegement body receivable into the engagement aperture on the cassette through an aperture in the base area; the ejector means comprising an ejector arm connected to the lever and an abutment means connected thereto for selective abutment wiht the cassette; and the lever being movable between lock and unlock positions, and when moving toward the lock position, the engagement body engaging with the engagement aperture of the cassette, and when moving toward the unlock position the abutment means and ejector arm are dimensioned such that the abutment means pushes the cassette partially out of the insertion slot.

12. A device according to claim 11 wherein the engagement body comprises a rotary body.

* * * * *